(12) United States Patent
Shiraishi

(10) Patent No.: US 7,397,502 B2
(45) Date of Patent: Jul. 8, 2008

(54) IMAGING APPARATUS INCLUDING CONTROL DEVICE FOR CONTROLLING WHITE BALANCE

(75) Inventor: Kenji Shiraishi, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 931 days.

(21) Appl. No.: 10/623,556

(22) Filed: Jul. 22, 2003

(65) Prior Publication Data
US 2004/0130632 A1    Jul. 8, 2004

(30) Foreign Application Priority Data
Jul. 31, 2002    (JP) ............................. 2002-223622

(51) Int. Cl.
*H04N 9/73* (2006.01)
*H04N 5/262* (2006.01)

(52) U.S. Cl. ................................ 348/223.1; 348/240.2

(58) Field of Classification Search .............. 348/223.1, 348/240.2, 225.1, 240.1
See application file for complete search history.

(56) References Cited

U.S. PATENT DOCUMENTS

| | | | | |
|---|---|---|---|---|
| 5,319,449 A | * | 6/1994 | Saito et al. ................ | 348/223.1 |
| 5,448,292 A | * | 9/1995 | Matsui et al. .............. | 348/224.1 |
| 5,760,831 A | * | 6/1998 | Tanaka et al. ............. | 348/223.1 |
| 6,353,488 B1 | * | 3/2002 | Hieda et al. ............... | 348/222.1 |
| 6,476,868 B1 | * | 11/2002 | Kaji et al. ................ | 348/333.02 |
| 6,522,353 B1 | * | 2/2003 | Saito et al. ................ | 348/223.1 |
| 6,618,091 B1 | * | 9/2003 | Tamura ................... | 348/240.99 |
| 6,795,115 B1 | * | 9/2004 | Okazaki ................... | 348/223.1 |
| 6,853,401 B2 | * | 2/2005 | Fujii et al. ................ | 348/240.2 |
| 7,148,922 B2 | * | 12/2006 | Shimada ................... | 348/224.1 |
| 2004/0130632 A1 | | 7/2004 | Shiraishi | |

FOREIGN PATENT DOCUMENTS

| | | | |
|---|---|---|---|
| JP | 7-284003 | | 10/1995 |
| JP | 2000-13675 | | 1/2000 |
| JP | 2000-165896 | | 6/2000 |
| JP | 3278206 | | 2/2002 |
| JP | 2003-143611 | * | 5/2003 |

OTHER PUBLICATIONS

U.S. Appl. No. 11/579,817, filed Nov. 7, 2006, Shinohara.
U.S. Appl. No. 11/028,307, filed Jan. 4, 2005, Shiraishi.
U.S. Appl. No. 10/914,196, filed Aug. 10, 2004, Shiraishi.
U.S. Appl. No. 10/244,670, filed Sep. 17, 2002, Sannoh et al.
U.S. Appl. No. 10/270,314, filed Oct. 15, 2002, Shinohara et al.
U.S. Appl. No. 10/623,556, filed Jul. 22, 2003, Shiraishi.

* cited by examiner

*Primary Examiner*—Nhan T Tran
(74) *Attorney, Agent, or Firm*—Oblon, Spivak, McClelland, Maier & Neustadt, P.C.

(57) ABSTRACT

An imaging apparatus includes an imaging device to photograph an object and to convert an image of the object into an electronic image signal, a feature detection device to conduct a feature detection for a white balance control in accordance with the image signal, a white balance control device to conduct the white balance control by using a result of the feature detection device, a zoom area selection device to select the zoom area of the image signal in accordance with the imaging device, a display device to display the image signal of the area selected by the zoom area selection device, and a feature detection area selection device for a selecting area to conduct the feature detection for the white balance control.

8 Claims, 4 Drawing Sheets

IMAGING APPARATUS INCLUDING CONTROL DEVICE FOR CONTROLLING WHITE BALANCE

BACKGROUND OF THE INVENTION

1. Field of the Invention

The present invention relates to an imaging apparatus, and more specifically, to an imaging apparatus having an effective white balance control.

2. Description of the Prior Art

A digital camera as an image input device has been used widely spread together with a development of a personal computer in recent years. Especially, the digital camera is used by means of a photographer who has no special techniques, in many cases. Many digital cameras are adapted to set automatically a shutter speed, an exposure, and a focusing corresponding to an object in order to eliminate a failure in photographing.

Moreover, generally a person is used as the object in many cases; there is also a digital camera, which specially equips a person specific set-up mode. An important thing for these digital cameras is how to carry out a white balance control accurately, and a quality of a photographing result is depended on the accuracy of this white balance control.

Two methods have been used for the white balance control of an electronic imaging apparatus generally. The first method is to measure a color of a light source by an external sensor to carry out the white balance control in accordance with the measured color of the light source. The second method is to conduct an extraction of a feature with respect to a color from an output signal of an image pick up device to carry out the white balance control based on the result of the extraction of the feature.

In a conventional electronic imaging apparatus, the detection of a screen feature for the white balance control has been executed with respect to a display range selected as well as an AE. In this case, because the feature is extracted from only within the screen, when most part of the screen is occupied by a skin color such as a portrait photographing, there is a case that a judgment of the color of the light source for the white balance control is miss-judged as a light source having a low color temperature.

Consequently, as the prior art, Japanese Paten Laid-Open Hei 7-284003 discloses that an object area, which conducts processing of AE, AF, and AWB in accordance with an electronic zoom area, is optimized by changing the object area of conducting the processing of AE, AF, and AWB in accordance with a magnification of an electronic zoom. Basically, this prior art is adapted to conduct the processing within the range of the electronic zoom as the object area.

Moreover, in the imaging apparatus including a conversion function of an aspect ratio disclosed in Japanese Patent No. 3278206, an extraction area of a white balance data in accordance with a conversion correction is changed. This is the area correction in accordance with the aspect conversion, and therefore data from an outside of a displayed area are not used for the white balance control.

SUMMARY OF THE INVENTION

It is, therefore, an object of the present invention to provide an imaging apparatus including a control device to conduct a white balance control appropriately when an electronic zoom is used.

To accomplish the above object, according to a first aspect of the present invention, an imaging apparatus comprises an imaging device to photograph an image of an object, and convert the image of the object into an electronic image signal, a feature detection device to detect a feature for the white balance control in accordance with the electronic image signal, and a white balance control device to control the white balance based on a result of the feature detection device. The imaging apparatus further comprises a device to select a zoom area of the image signal in accordance with the imaging device, a display device to display the image signal of the area selected by the zoom area selection device, and a device to select an area to conduct the feature detection for the white balance control. The feature detection area selection device conducts the selection of the feature detection area in accordance with the area photographed by the imaging device and the area selected by the zoom area selection device.

When the electronic zoom is operated, a proportion in which a screen is occupied by a main image tends to be larger. In a system conducting the white balance by detecting the feature of the color within the screen, if the screen includes a large amount of the same color, there are some cases that whether the color is a color of a light source illuminating the object or not, or whether the color is the color of the object or not can not be judged. In this case, a miss-operation such as white becoming the object color will occur.

According to the present invention, when the electronic zoom is performed, much color information within the screen is extracted by extracting the color information from a broader area than a displayed area, and as a result, it is possible to lower the possibility of an occurrence of the miss-operation.

In a second aspect of the present invention according to the first aspect, the white balance control device is adapted to be capable of selecting whether the feature detection area selected by the feature detection area selection device and the zoom area selected by the zoom area selection device are an identical area or not.

In many cases, the probability of the miss-operation for the white balance can be lowered by use of the device in the first aspect. However, there is a possibility of a negative influence. Therefore, if it is possible to select matching between the feature detection area and the displayed area voluntarily, the object, which has influence on the white balance, is specified by the display screen, and it makes easy to take action such as a changing flaming.

According to the present invention, it is possible to select that whether the feature detection area is matched with the displayed area or not. The object, which influences the white balance, is specified by the display screen, and the action such as the changing framing can be taken.

In a third aspect of present invention according to the second aspect, the feature detection device divides the feature detection area into several areas and conducts the feature detection in each divided area respectively.

When a mode, which matches the zoom area and the feature detection area, is selected, the white balance control carries out the white balance control without the result of the feature detection for the area, which is not included in the zoom area.

When the mode, which does not match the zoom area and the feature detection, is selected, the white balance control carries out with the result of the feature detection from all area photographed by the imaging means.

In a mode which uses only the result of the feature detection of the range selected by the digital camera for the white balance control, the white balance control is conducted without the data from the feature extraction area, which are not included in the digital zoom area.

According to the present invention, the third aspect of present invention conducts the same functional effect as the first and the second aspect of the present invention.

In a fourth aspect of the present invention according to the second aspect, the feature detection device divides the feature detection area into the several areas and conducts the feature detection in the each divided area respectively. The imaging apparatus further comprises a weighting setup device to set an influence degree for the white balance control to data in the each area within the feature detection area. When a mode which does not match the zoom area and the feature detection area, is selected, the white balance control device conducts the weighting to the result of the feature detection in the each area in accordance with the weighting set by the weighting setup device and conducts the white balance control with the weighted result of the feature detection.

When a mode in which the white balance control is conducted by using the outside range of the digital zoom framing is selected, the degree of influence on the white balance control is changed in accordance with the result of the feature extraction from each area such as the area within the framing range, the area one part is included in the framing range, and the area outside the framing.

According to the present invention, a stable white balance control can be accomplished by carrying out the weighting such that the data within the framed range is used selectively and the data from outside of the framed range is also used effectively.

In a fifth aspect of present invention according to the first aspect, the feature detection device divides the feature detection area into several areas and conducts the feature detection device in each area. The imaging apparatus further comprises the weighting setup device to set the influence degree to the white balance control for the data in the each area within the feature detection area. When a macro-mode or a portrait mode is selected as a photographing mode, the weighing setup device sets equally the weighting for the result of the feature detection in the area, which is not included in the zoom area, and the weighting for the result of the feature detection within the zoom area. The white balance control device conducts the weighting as the result of the feature detection in the each area in accordance with the weighting set by the weighting setup device, and conducts the white balance control with the weighted result of the feature detection.

In the portrait mode, the probability of the existence of a person within the screen is high. In this case, it is effective to use the area which is not included in the zoom area.

According to the present invention, more accurate white balance control is achieved by setting the weighting automatically with a photographing condition, which can specify the object in accordance with the set mode.

In a sixth aspect of the present invention according to the forth aspect, when the macro-mode or the portrait mode is used as the photographing mode, the weighting setup device sets equally the weighting for the result of the feature detection in the area, which is not included in the zoom area, and the weighting for the result of the feature detection within the zoom area. The white balance control device conducts the weighting to the result of the feature detection in the each area in accordance with the weighting set by the weighting setup device and conducts the white balance control with the weighted result of the feature detection.

According to the present invention, the sixth aspect of the present invention conducts the same function effect as the fifth aspect of the present invention.

In a seventh aspect of the present invention according to the first aspect, the feature detection device divides the feature detection area into the several areas and conducts the feature detection in the each divided area respectively. The present invention further comprises a weighting setup device to set the influence degree for the white balance control to the data in the each area within the feature detection area. if a light source of a high brightness is included in the result of the feature detection in the area, which is not included in the zoom area, the weighting setup device sets the weighting for the result of the feature detection in the area, which is not included in the zoom area, lower than the result of the feature detection within the zoom area. The white balance control device conducts the weighting as the result of the feature detection in the each area in accordance with the weighting set by the weighting setup device and conducts the white balance control with the weighted result of the feature detection.

When a very high brightness part is included in one part of the screen by a photometry result, there is a possibility that the light source is included in the part. When the light source is included in the background of the object, there is a possibility that the light source and the light source irradiating the object have a different coloration. In this case, it is better not to use the data of the high brightness area in order to achieve the accurate white balance.

According to the present invention, for the area including a different condition especially from other areas, the stable white balance control can be accomplished by changing the weighting such as lowering the weighting.

In an eighth aspect of the present invention according to the forth aspect, when the light source of the high brightness is included in the result of the feature detection in the area, which is not included in the zoom area, the weighting setup device sets the weighting for the result of the feature detection in the area, which is not included in the zoom area, lower than the result of the feature detection within the zoom. The white balance control device conducts the weighting to the result of the feature detection in the each area in accordance with the weighting set by the weighting setup device and conducts the white balance control with the weighted result of the feature detection.

According to the present invention, the eighth aspect of the present invention conducts the same function effect as the seventh aspect.

In a ninth aspect of the present invention according to the sixth aspect, when the light source of the high brightness is included in the result of the feature detection in the area, which is not included in the zoom area, the weighing setup device sets the weighting for the result of the feature detection in the area, which is not included in the zoom area, lower than the result of the feature detection within the zoom area.

The white balance control device conducts the weighting to the result of the feature detection in the each area in accordance with the weighting set by the weighting setup device, and conducts the white balance control with the weighted result of the feature detection.

According to the present invention, the ninth aspect of the present invention conducts the same function effect as the seventh aspect.

In a tenth aspect of the present invention according to the first aspect, the present invention comprises a live view function for confirming the flaming of the electronic zoom until a time of photographing. An operation result of the feature detection area selection device and a result of white balance processing depending on a specific photographing condition can be confirmed by a live view screen with a condition displaying the live view screen by the display device.

According to the present invention, the result of the white balance control at the time of photographing is projected by a device of switching the feature extraction range and of changing the photographing condition by a live view condition before the photographing, and a photographing failure can be reduced.

In an eleventh aspect of the present invention according to the second aspect, the present invention comprises the live view function for confirming the framing of the electronic zoom until the time of photographing. The operation result of the feature detection area selection device and the result of the white balance processing depending on the specific photographing condition can be confirmed by the live view screen with the condition displaying the live view screen by the display device.

According to the present invention, the eleventh aspect of the present invention conducts the same function effect as the tenth aspect.

In a twelfth aspect of the present invention according to the third aspect, the present invention comprises the live view function for confirming the framing of the electronic zoom until the time of photographing. The operation result of the feature detection area selection device and the result of the white balance processing depending on the specific photographing condition can be confirmed by the live view screen with the condition displaying the live view screen by the display device.

According to the present invention, the twelfth aspect of the present invention conducts the same function effect as the tenth aspect.

In a thirteenth aspect of the present invention according to the tenth aspect, the present invention comprises the live view function for confirming the flaming of the electronic zoom until the time of photographing. The operation result of the feature detection area selection device and the result of the white balance processing depending on the specific photographing condition can be confirmed by the live view screen with the condition displaying the live view screen by the display device.

According to the present invention, the thirteenth aspect of the present invention conducts the same function effect as the tenth aspect.

DETAILED DESCRIPTION OF THE PREFERRED EMBODIMENTS

Embodiments of the present invention will be explained as follows with referring to accompanying drawings. However, a component of a constitution, a type, a combination, a form, a relative configuration, and so on, which are described in these embodiments, are simple examples for explanations unless a specified mention is stated.

It should be noted that a scope of the present invention is not limited to these embodiments.

Figure 1:
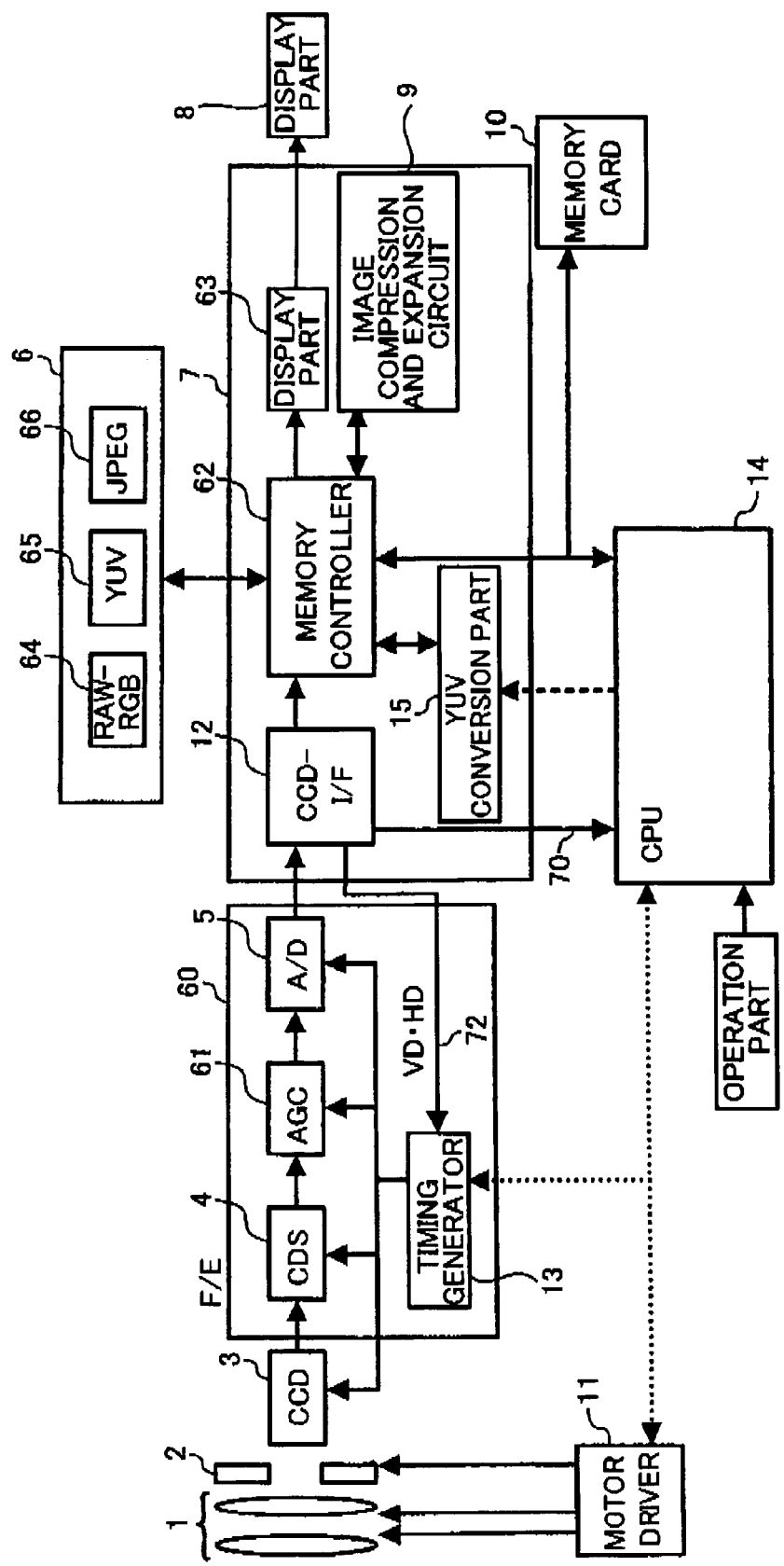
FIG. 1 is a block diagram of a digital still camera for an embodiment of the present invention.

FIG. 1 is a block diagram of a digital still camera for one embodiment of the present invention. The digital still camera (imaging apparatus) has lenses 1 to condense an optic image of an object, a diaphragm part 2 to focus a luminous flux condensed by the lenses 1, a motor driver 11 to focus several lenses (not shown) by moving and to activate the diaphragm part 2, a CCD (Charge Coupled Device) 3 to conduct a photoelectric conversion for the optic image, which passed through the lenses 1 and the diaphragm part 2, a CDS (Correlated Double Sampling) 4 to reduce a noise included in the CCD 3, and an A/D convert 5 to convert an analog signal, which is inputted through an AGC 61 from the CCD 3, into a digital signal.

The digital still camera also has a timing generator 13 to generate the timing of the CCD 3, CDS 4, A/D convert 5, and so on, as receiving an input synchronized signal of VD and HD from a CCD-I/F 12 (reference numeral 72), a digital signal processing circuit 7 comprising a memory controller 62, and so on to process the image in accordance with an image processing parameter, a memory frame 6 to record an image pixel and to store the processed image, a display part 8 (display means) to display a image by a LCD (Liquid Crystal Display), an image compression and expansion circuit 9 to compress the image processed by the digital signal processing circuit 7 or to expand to original image data, a memory card 10 to store the image data compressed by the image compression and expansion circuit 9, a CPU 14 to conduct predetermined control based on a control program, and an operation part for the camera 17 comprising a release button, and so on to operate the main part of the digital camera by an operator.

An operation outline of the digital still camera according to the present composition will be described referring to the FIG. 1, below.

The operator looks at the object through a finder (not shown). When the operator presses the release button of the operation part for the digital camera, the CPU 14 detects the signal, and the lenses 1 and the diaphragm 2 are actuated by the motor driver 11, and then the image of the object is focused on the CCD 3. These operations are conducted automatically by the CPU 14 in accordance with information by a sensor (not shown). The image focused on the CCD 3 is taken out sequentially by a clock generated from the timing generator 13, and then the noise included in data by the CDS 4 is reduced. The noise included in the output signal of CCD 3 is mainly dominated by a reset noise.

In order to reduce the noise, the reset noise is canceled by subtracting a picture signal and the reset noise included in a signal period from the reset noise included only in a filed through period. The analogue signal is taken out from a F/E 60, and inputted in the digital signal processing circuit 7 after converted into 10 bit of the digital signal by the A/D convert 5. After that, the analogue signal is stored in the frame memory 6 temporarily. In accordance with an instruction from the CPU 14, the data, which are stored temporary in the frame memory 6 by a parameter placed in a memory (not shown), is processed by the digital signal processing circuit 7.

The processed image is stored in the frame memory 6 again. This processing includes a white balance processing. Moreover, the data written in the frame memory 6 are sent to the control part of the display part 8, and then the content of the data is displayed on the LCD. The frame memory 6 is the image memory, which can accumulate at least more than one image panel comprising an imaging pixel of the image data.

In FIG. 1, numeral 64 denotes an area for storing RAW-RGB type data, numeral 65 an area for storing YUV type data, and numeral 66 an area for storing JPEG type data. General memories, for example, such as a VRAM (Video Random Access Memory), a SRAM (Static Random Access Memory), a DRAM (Dynamic Random Access Memory), or a SDRAM (Synchronous DRAM) are used in this frame memory 6.

When recording the image in the memory card 10, the digital signal processing circuit 7 is controlled as transforming the image to the memory 10 by the CPU 14 in accordance with an instruction of the operator from the operation part of the digital camera 17.

In other words, the processed image is red from the frame memory 6, and then sent to the image compression and expansion circuit 9. The image is compressed by a JPEG method (Joint Photographic Experts Group) herein, and stored in the memory card 10.

An ADCT (Adaptive Discrete Cosine Transform) is used for this cording algorithm. At first, an image having a low resolution is corded, and a hierarchical cording such as increasing the resolution gradually is adopted.

In this way, the memory card 10 is for storing the compression data in which the data stored in the frame memory 6 is compressed. In addition to this, the digital still camera can be made up as recording the compression data for example in about 8 MB of an internal memory or Smart Media Compact Flash (registered trademark), and so on.

On the other hand, when displaying the content of the memory card 10 on the display part 8 and transforming the image data connected with other PC by an external terminal, the operator inserts a preferable memory card 10 into a connector (not shown) of the digital camera's body. In accordance with the instructions from the operation part of the digital camera 17, the digital signal processing circuit reads the compressed image data in the memory card 10 by the instructions from the CPU 14 to the digital signal processing circuit 7. This compressed image data are inputted in the image compression and expansion circuit 9 and expanded again in accordance with a compression algorithm, and then displayed as the image on the display part 8 through an interface of a display part 63.

Subsequently, the basic operation of an AWB control will be explained. The object is projected into the CCD 3 through the lenses 1. The CCD 3 converts the object into the electronic signal (analogue image data), and the analogue image data of R, G, and B are outputted. This analogue image data are converted into the digital image signal of R, G, and B by the A/D convert 5.

The converted digital image data are stored in the frame memory 6. The digital signal processing circuit 7 reads integrated values of R, G, and B for a specific part or a whole image panel by the CCD-I/F 12 when loading the digital image data. The CPU 14, the controlling part, reads this integrated values of R, G, and B (reference numeral 70), and detects features, and then calculates a gain of Rg and a gain of Bg of the white balance in which the balance becomes appropriate.

The YUV conversion part 15 is outputted in the frame memory 6 after converting R, G, and B data into a brightness Y and color difference Cb data and Cr data. When the image is converted, the white balance gain Rg and Bg are set up (reference numeral 71) from the CPU 14 to the convert part of YUV 15. The data accumulated in the frame memory 6 are red into the image compression and expansion circuit 9 inside the digital signal processing circuit 7, and compressed by for example JPEG compression. The compressed data is recorded in the memory card 10.

Figure 2:
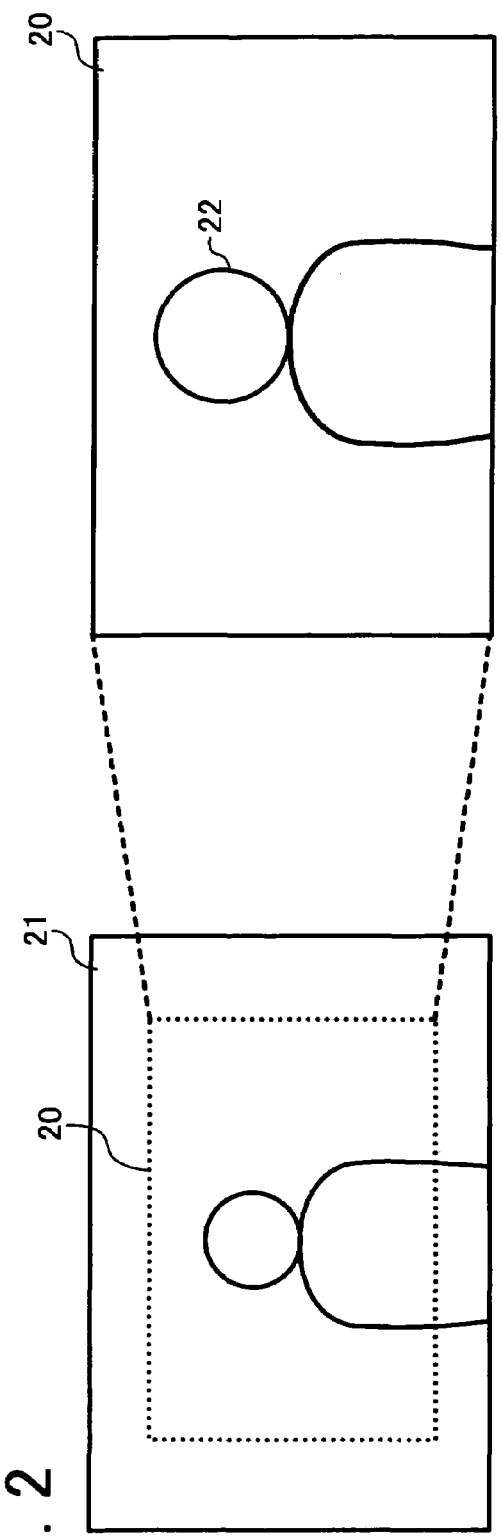
FIG. 2 is a view explaining an electronic zoom operation for a first embodiment of the present invention.

FIG. 2 is a view explaining an electronic zoom operation for the first embodiment of the present invention. The left view of FIG. 2 shows the whole range of an imaging pick up device and a range of an electronic zoom. The right view shows display at the time of operating the electronic zoom. When the electronic zoom is set up by the operation part of the camera 17, the CCD-I/F 12 is outputted into the frame memory 6 as the imaging range only in a set-up electronic zoom range 20. The data temporary stored in the frame memory 6 are processed as above mentioned, and displayed on the display part 8. The electronic zoom is explained by limiting the range that the data of the CCD-I/F 12 are loaded into the frame memory 6. However, the electronic zoom can be accomplished by displaying partly expanded the data when converting into the YUV or reading the data for the display after normally conducted loading the data into the frame memory 6.

The present invention integrates R, G, and B for the range 21 of the photographed whole data in the CCD-I/F 12 even the electronic zoom is selected. The AWB is operated by the integrated value. A specific object, for example, a ratio in which the person 22 occupies the image panel is increased by raising the magnification of the zoom, the skin color of the person have influence on the feature detection of the screen for the AWB.

However, it is possible to eliminate the influence on the AWB by a zooming up by integrating R, G, and B with using all the imaging data (range 21).

Figure 3:
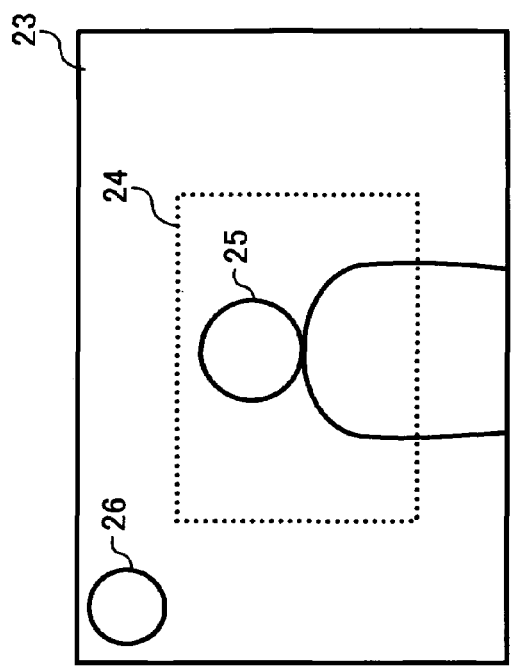
FIG. 3 is a view explaining all range of an image pick up device and an electronic zoom range for a second embodiment of the present invention.

FIG. 3 is a view describing a whole range of the imaging pick up device and a range of the electronic zoom for the second embodiment of the present invention. Reference numeral 25 denotes an object within an electronic zoom range 24. It is capable of selecting whether the electronic zoom range 24 is matched with the range of the feature extraction for the screen of the AWB or not by the present invention. It is better not to narrow the range of the feature extraction for the screen because a possibility of a miss-operation is lowered. However, if an area outside of a framed range is occupied by a specific color, an unsuccessful result might be received by the extraction of the feature from the whole screen.

As shown in FIG. 3, if a red light source 26, and so on appear outside the framed rage 23, the AWB is affected by the red light source, and the screen is shifted to blue, which is a cause of the miss-operation. Moreover, for example, when photographing a cloud in a blue sky, the white color of the cloud can be controlled as being a white by the zooming up the cloud, and extracting the feature from the zoomed up range. However, if the data from the blue sky an outside of the cloud are used, the AWB is controlled to a direction such as becoming the blue sky the white, and the miss-operation such as becoming the cloud a yellow is happened. In this case, it is possible to change that the AWB is conducted by carrying out the feature extraction from the framed screen 23 by the electronic zoom.

Figure 4A:
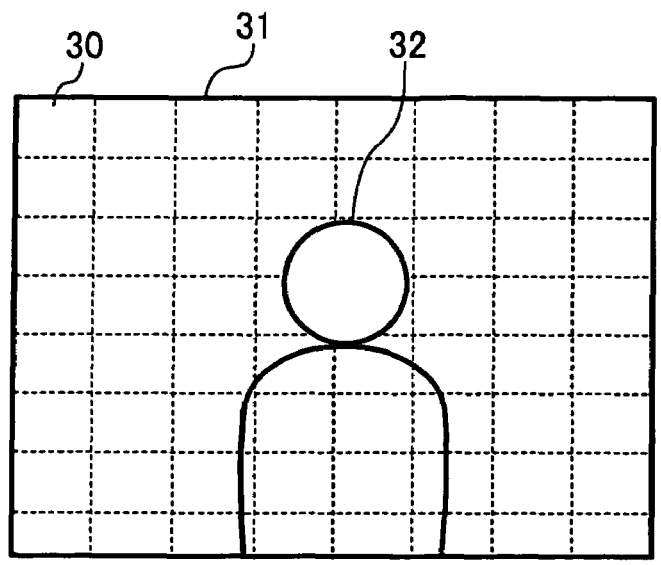
FIG. 4 is a view explaining an electronic zoom operation for a third embodiment of the present invention.
Figure 4B:
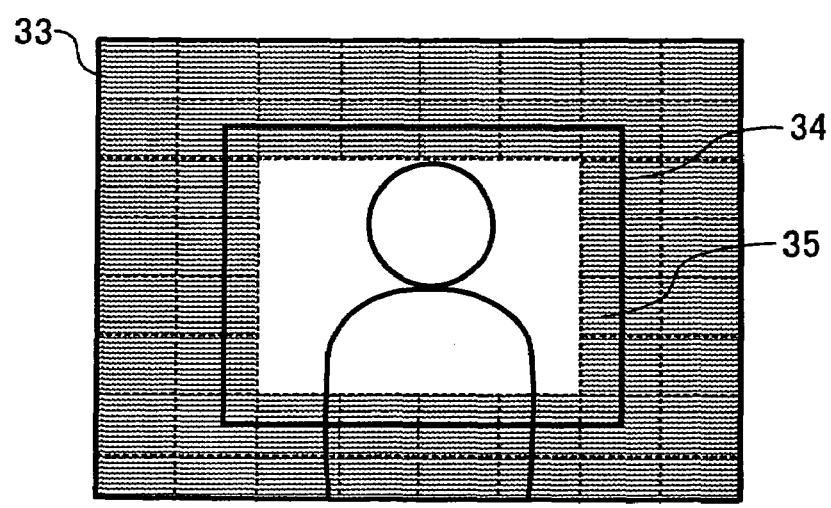

FIG. 4 is a view explaining the electronic zoom operation for the third embodiment of the present invention. FIG. 4A is a view of a divided feature detection area. The reference numeral 32 denotes an object in the feature detection area 31. The feature detection area 31 is divided by a unit showing as reference numeral 30. The feature extraction is carried out by a feature extraction device in the each area 30. FIG. 4B is a view showing a case selecting a mode that the zoom area 34 and the feature detection area 35 are matched. The AWB control is carried out without using the result of the feature detection in an area 33, which is not included in a zoom area 34.

Moreover, in a mode conducting the AWB control by using the result of the feature extraction for an outside of the area selected by the digital zoom, the AWB control is carried out by use of data showing as a shaded area 33.

Figure 5:
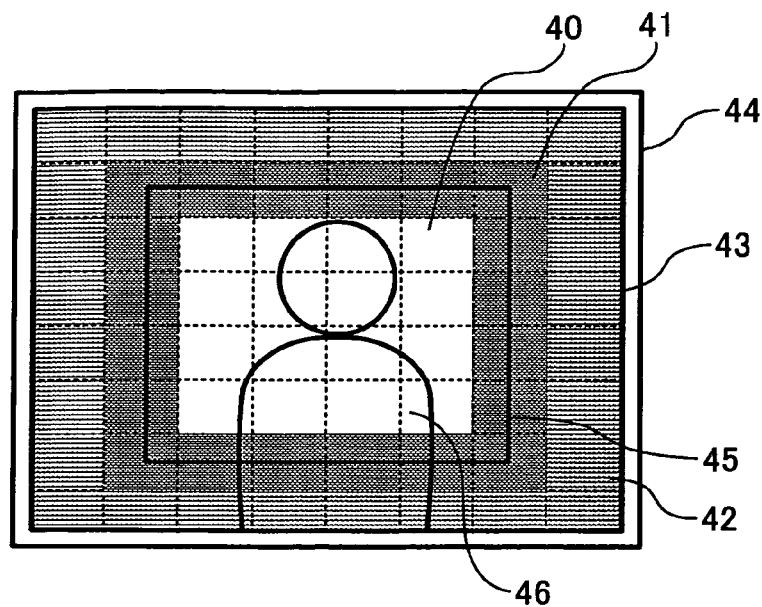
FIG. 5 is a view explaining an electronic zoom operation for a fourth embodiment of the present invention.

FIG. 5 is a view explaining the electronic zoom operation for the fourth embodiment of the present invention. Reference numeral 46 denotes an object in an electronic zoom range 45. Reference numeral 44 is an output range of the CCD. Reference numeral 43 is a feature extraction range within 44. Reference numeral 45 within a solid line is an electronic zoom range. When the mode conducting the AWB control is selected by using the outside range of the digital zoom framing, the degree of influence on the AWB is changed in accordance with the result of the feature extraction from each blocks such as 40 within the framing range, a block 41 in which one part is included in the framing range, and a block 42 an outside of a framing range. A weighting is carried out, such as one times for the block data within the framing range, 0.6 times for the block data in which one part is within the framing range, and 0.3 times for the block data the outside of the framing range. The stable AWB control is achieved by using the framed range 40 selectively, and also using data of the outside framed range 42 effectively.

As the other embodiment, the degree of influence on the data of the outside of the framing range 42 can be changed in accordance with the photographing condition. For example, in a camera which can select the photographing mode such as a macro mode, and a portrait mode, when the portrait mode is selected, the possibility that a person 46 is within the screen becomes higher, and if the electronic zoom is used, the possibility of increasing the degree in which the flamed range is occupied by the person goes up. Therefore, when the portrait mode is selected, the possibility of conducting the stable AWB control becomes higher by the weighting equally the feature data extracted from the block 42, the outside of the flaming range and the data within the flaming range.

When the macro mode is selected, close-up photographing is highly used. In this case, the possibility that a specified color of the object is occupied within the screen goes up. In this case, the possibility of conducting a stable AWB becomes higher by weighting equally the data the outside of the flaming range 42 and the data within the flaming range 40.

Figure 6:
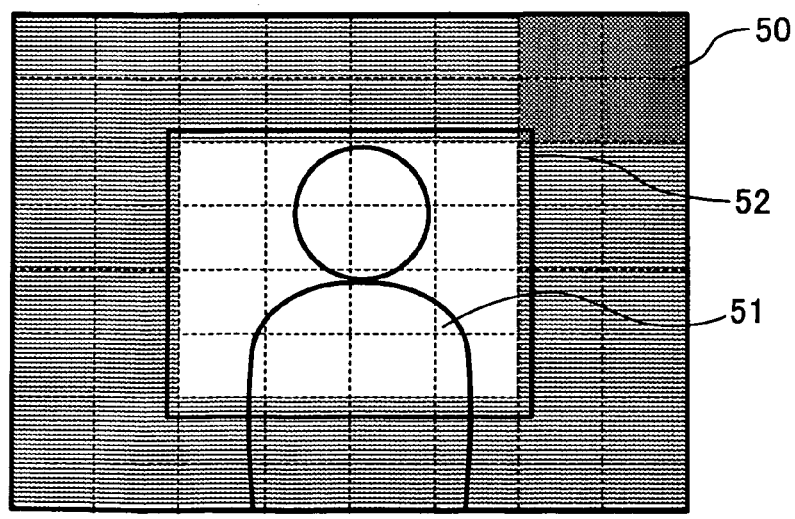
FIG. 6 is a view explaining an electronic zoom operation for a fifth embodiment of the present invention.

FIG. 6 is a view describing the electronic zoom operation for a fifth embodiment of the present invention. For example, a photometry result of AE, and so on can be used as the photographing condition. When a very high brightness part 50 is found in one part of the screen as FIG. 6 (for example, one part outside of electronic zoom range 52) by the photometry result of AE, the part has a possibility of including the light source. If the light source appears, this light source is directed to the camera, so that there is a possibility that the light source illuminating an object 51 has a different coloration from the light source appeared on the screen. In this case, it is better not to use the block data of an area 50 measured as the high brightness part, so that the accurate AWB can be achieved. Consequently, the stable AWB can be operated by changing the weighting such as lowering the weighting, and so on especially for an area having the different condition from other areas.

The use of the outside of the framing range can be selected, and the result of changing the weighting can be confirmed by the display part. Therefore, a photography failure can be reduced by confirming the result with a live view condition before photographing and changing the area.

As mentioned above, according to the first aspect of the present invention, it is capable of extracting much color information within the screen by extracting the color information from the broader area than the displayed area when the electronic zoom operation is carried out, and as a result it is possible to lower the possibility of the miss-operation.

According to the second aspect of the present invention, it is capable of selecting voluntarily whether the feature detection area is matched to the displayed range or not, so that it is possible to specify the object affected to the AWB by the display screen, and to take action such as changing the flaming, and so on.

According to the third aspect of the present invention, the same operation effect as the first aspect and the second aspect is conducted.

According to the fourth aspect of the present invention, the flamed range is used selectively by the weighting as described above and, it is possible to carry out the stable AWB by using the data the outside of the framing effectively.

According to the fifth and the sixth aspect of the present invention, it is possible to achieve more accurate AWB control by setting the weighting automatically in accordance with the photographing condition, which can specify the object by the set-up mode.

According to the seventh, eighth, and ninth aspects of the present invention, it is possible to have the stable AWB control by changing the weighting such as lowering the weighting especially for the area having the different condition from other areas.

According to the tenth, eleventh, twelfth, and thirteenth aspects of the present invention, it is also possible to forecast the result of the AWB balance at the time of photographing by carrying out changing the photography condition or switching the feature extraction area with the live-view condition before the photographing, and to reduce the photography failure.

What is claimed is:

1. An imaging apparatus comprising:
   an imaging device to photograph an image of an object and convert said image of the object into an electronic image signal;
   a feature detection device to detect a feature for a white balance control in accordance with said electronic image signal; and
   a white balance control device to carry out the white balance control based on a result of said feature detection device;
   said imaging apparatus further comprising:
   a device to select a zoom area of the image signal by said imaging device;
   a device to display the image signal of the area selected by said zoom area selection device; and
   a device to select an area to conduct the feature detection for said white balance control, wherein
   said feature detection area selection device conducts the selection of said feature detection area in accordance with an area photographed by said imaging device and the area selected by said zoom area selection device;
   said white balance control device is adapted to be capable of selecting as to whether the feature detection area selected by said feature detection area selection device and the zoom area selected by said zoom area selection device are an identical area or not; and
   said feature detection device divides said feature detection area into several areas, and conducts a feature detection in each divided area, respectively, wherein said white balance control device conducts the white balance control without using a result of a feature detection for an area which is not included in said zoom area when a mode which matches said zoom area and said feature detection area is selected, and conducts the white balance control with a result of a feature detection from all of the area photographed by said imaging device when a mode which does not match said zoom area and said feature detection area is selected, wherein the imaging apparatus further comprises:

a weighing setup device to set an influence degree of the white balance control to data in each area within said feature detection area, wherein said weighting setup device sets equally a weighting for a result of the feature detection in each of the areas, which are not included in said zoom area, and a weighing for a result of the feature detection in each of the areas within said zoom area when a macro mode or a portrait mode is used as a photographing mode; and wherein said white balance control device conducts the weighting to the result of the feature detection in said each area in accordance with the weighting set by said weighting setup device, and conducts the white balance control by use of said weighted result of the feature detection.

2. An imaging apparatus according to claim 1, wherein when the mode which does not match said zoom area and said feature detection area is selected, said white balance control device conducts a weighting to a result of the feature detection in said each area in the feature detection area in accordance with the weighting set by said weighting setup device, and conducts the white balance control by use of said weighted result of the feature detection.

3. An imaging apparatus according to claim 2, wherein said weighting setup device sets a weighting for a result of the feature detection in each of the areas, which are not included in said zoom area, lower than a weighting for a result of the feature detection in each of the areas within said zoom area if a light source of a high brightness is included in the result of the feature detection in each of the areas which are not included in said zoom area, wherein said white balance control device conducts the weighting to the result of the feature detection in said each area in accordance with the weighting set by said weighting setup device, and conducts the white balance control with said weighted result of the feature detection.

4. An imaging apparatus according to claim 1, wherein it further comprises:

a live view function for confirming a framing of electronic zoom until a time of photographing, and wherein an operation result of said feature detection area selection device and a result of a white balance processing depending on a specific photographing condition are confirmed by a live view screen with a condition displaying said live view screen by said display device.

5. An imaging apparatus according to claim 2, wherein it further comprises:

a live view function for confirming a framing of electronic zoom until a time of photographing, wherein an operation result of said feature detection area selection device and a result of a white balance processing depending on a specific photographing condition are confirmed by a live view screen with a condition displaying said live view screen by said display device.

6. An imaging apparatus comprising:

an imaging device to photograph an image of an object and convert said image of the object into an electronic image signal;

a feature detection device to detect a feature for a white balance control in accordance with said electronic image signal; and a white balance control device to carry out the white balance control based on a result of said feature detection device;

said imaging apparatus further comprising:

a device to select a zoom area of the image signal by said imaging device;

a device to display the image signal of the area selected by said zoom area selection device; and a device to select an area to conduct the feature detection for said white balance control, wherein said feature detection area selection device conducts the selection of said feature detection area in accordance with an area photographed by said imaging device and the area selected by said zoom area selection device;

said white balance control device is adapted to be capable of selecting as to whether the feature detection area selected by said feature detection area selection device and the zoom area selected by said zoom area selection device are an identical area or not; and said feature detection device divides said feature detection area into several areas, and conducts a feature detection in each divided area, respectively, wherein said white balance control device conducts the white balance control without using a result of a feature detection for an area which is not included in said zoom area when a mode which matches said zoom area and said feature detection area is selected, and conducts the white balance control with a result of a feature detection from all of the area photographed by said imaging device when a mode which does not match said zoom area and said feature detection area is selected, wherein said imaging apparatus further comprises:

a weighting setup device to set an influence degree for the white balance control to data in each area within said feature detection area, wherein said weighting setup device sets a weighting for a result of the feature detection in each of the areas, which are not included in said zoom area, lower than a weighting for a result of the feature detection in each of the areas within said zoom area if a light source of a high brightness is included in the result of the feature detection in each of the areas which are not included in said zoom area, and wherein said white balance control device conducts the weighting to the result of the feature detection in said each area in accordance with the weighting set by said weighting setup device, and conducts the white balance control by said weighted result of the feature detection.

7. An imaging apparatus comprising:

an imaging device to photograph an image of an object and convert the image of the object into an electronic image signal;

a zoom area selection device to select a zoom area which is a part of an entire area of the image signal converted by said imaging device;

a detection area selection device configured to select a detection area from either the entire area photographed by the imaging device or the zoom area selected by the zoom area selection device, if the zoom area is selected by the zoom area selection device;

a feature-detection device to detect a feature for a white balance control in accordance with the detection area which is selected by the detection-area selection device; and a white balance control device to carry out the white balance control based on a result of the feature detection device, wherein said feature detection device divides said feature detection area into several areas, and conducts a feature detection in each divided area respectively; and wherein the imaging apparatus further comprises:

a weighing setup device to set an influence degree of the white balance control to data in each area within said feature detection area, wherein said weighting setup device sets equally a weighting for a result of the feature detection in each of the areas, which are not included in said zoom area, and a weighing for a result of the feature detection in each of the areas within said zoom area when a macro mode or a portrait mode is used as a photographing mode; and wherein said white balance control device conducts the weighting to the result of the feature detection in said each area in accordance with the weighting set by said weighting setup device, and conducts the white balance control by use of said weighted result of the feature detection.

8. An imaging apparatus according to claim 7, further comprising a displaying device to display the image signal of the zoom area selected by the zoom area selection device.

* * * * *